(12) United States Patent
Douglas et al.

(10) Patent No.: US 11,140,659 B2
(45) Date of Patent: *Oct. 5, 2021

(54) WIRELESS ORGANIZATION OF ELECTRICAL DEVICES BY SENSOR MANIPULATION

(71) Applicant: SIGNIFY HOLDING B.V., Eindhoven (NL)

(72) Inventors: Bruce Andrew Carl Douglas, Fayetteville, GA (US); Dominic Pritham, Fairburn, GA (US); Ryan Cunningham, Fayetteville, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 77 days.

This patent is subject to a terminal disclaimer.

(21) Appl. No.: 16/547,330

(22) Filed: Aug. 21, 2019

(65) Prior Publication Data
US 2020/0068529 A1  Feb. 27, 2020

Related U.S. Application Data

(60) Provisional application No. 62/720,571, filed on Aug. 21, 2018.

(51) Int. Cl.
| *H04W 72/00* | (2009.01) |
| *H04W 4/38* | (2018.01) |
| *H04L 29/08* | (2006.01) |
| *H04W 76/11* | (2018.01) |
| *H04L 1/08* | (2006.01) |

(Continued)

(52) U.S. Cl.
CPC ............. *H04W 72/005* (2013.01); *H04L 1/08* (2013.01); *H04L 67/1048* (2013.01); *H04W 4/38* (2018.02); *H04W 76/11* (2018.02)

(58) Field of Classification Search
None
See application file for complete search history.

(56) References Cited

U.S. PATENT DOCUMENTS

| 7,994,723 B2 | 8/2011 | Budde et al. |
| 8,698,607 B2 * | 4/2014 | Van De Sluis ........ H05B 47/19 340/12.22 |
| 8,829,821 B2 | 9/2014 | Chobot et al. |

(Continued)

OTHER PUBLICATIONS

Dodson, U.S. Appl. No. 62/562,532, filed Sep. 25, 2017 (Year: 2017).*

*Primary Examiner* — Jay L Vogel

(57) ABSTRACT

A system can include a first electrical device having a first sensor device, where the first sensor device is configured to measure a first parameter used in operating the first electrical device, where the first sensor device is further configured to detect a first condition that is unrelated to operating the first electrical device, where the first condition is created by a trigger device controlled by a user, where the first sensor device, upon detecting the first condition, broadcasts a first communication that includes a first identification of the first sensor device. The system can also include a gateway communicably coupled to the first electrical device, where the gateway receives the first communication from the first electrical device, where the gateway assigns the first electrical device to a first group based on the first identification of the first sensor device.

16 Claims, 9 Drawing Sheets

(51) Int. Cl.
*H04W 4/06* (2009.01)
*H04W 4/08* (2009.01)

(56) References Cited

U.S. PATENT DOCUMENTS

| | | |
|---|---|---|
| 9,072,133 B2 | 6/2015 | Chemel et al. |
| 10,366,048 B2* | 7/2019 | Wang .................. H04L 12/2809 |
| 2015/0245182 A1* | 8/2015 | Scagnol .................. G06F 21/44 |
| | | 370/312 |
| 2016/0098923 A1* | 4/2016 | Patkar .................... G08C 23/04 |
| | | 398/106 |
| 2017/0041381 A1* | 2/2017 | Tal ........................ H04W 12/04 |
| 2017/0041886 A1* | 2/2017 | Baker ..................... H04W 4/80 |
| 2019/0098715 A1* | 3/2019 | Dodson .................. H05B 47/10 |
| 2020/0067611 A1* | 2/2020 | Douglas ................ H04W 76/11 |

* cited by examiner

WIRELESS ORGANIZATION OF ELECTRICAL DEVICES BY SENSOR MANIPULATION

CROSS-REFERENCE TO RELATED APPLICATIONS

This application claims priority under 35 U.S.C. § 119 to U.S. Provisional Patent Application Ser. No. 62/720,571, titled "Wireless Organization of Electrical Devices By Sensor Manipulation" and filed on Aug. 21, 2018, the entire contents of which are hereby incorporated herein by reference.

TECHNICAL FIELD

The present disclosure relates generally to electrical systems, and more particularly to systems, methods, and devices for wirelessly organizing electrical systems into sets.

BACKGROUND

In an office space or other environment within a building, a number of electrical devices (e.g., light fixtures, printers, wall outlets) are spread throughout the area. Some of these electrical devices can share one or more characteristics. For example, some electrical devices can all be light fixtures. As another example, some electrical devices can be located in a common volume of space (e.g., a room, a floor of a building, a grouping of rooms). Organizing electrical devices by one or more of these characteristics can be useful.

SUMMARY

In general, in one aspect, the disclosure relates to a system that can include a first electrical device having a first sensor device, where the first sensor device is configured to measure a first parameter used in operating the first electrical device, where the first sensor device is further configured to detect a first condition that is unrelated to operating the first electrical device, where the first condition is created by a trigger device controlled by a user, where the first electrical device, upon the first sensor device detecting the first condition, broadcasts a first communication that includes a first identification of the first sensor device. The system can also include a gateway communicably coupled to the first electrical device, where the gateway receives the first communication from the first electrical device, where the gateway assigns the first electrical device to a first group based on the first identification of the first sensor device.

In another aspect, the disclosure can generally relate to a system that can include a first electrical device having a first sensor device, where the first sensor device is configured to measure a first parameter used in operating the first electrical device, where the first sensor device is further configured to detect a first condition that is unrelated to operating the first electrical device, where the first condition is created by a trigger device controlled by a user, where the first electrical device, upon the first sensor device detecting the first condition, broadcasts a first communication that includes a first identification of the first electrical device. The system can also include a gateway communicably coupled to the first electrical device, where the gateway receives the first communication from the first electrical device, where the gateway assigns the first electrical device to a first group based on the first identification of the first electrical device.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
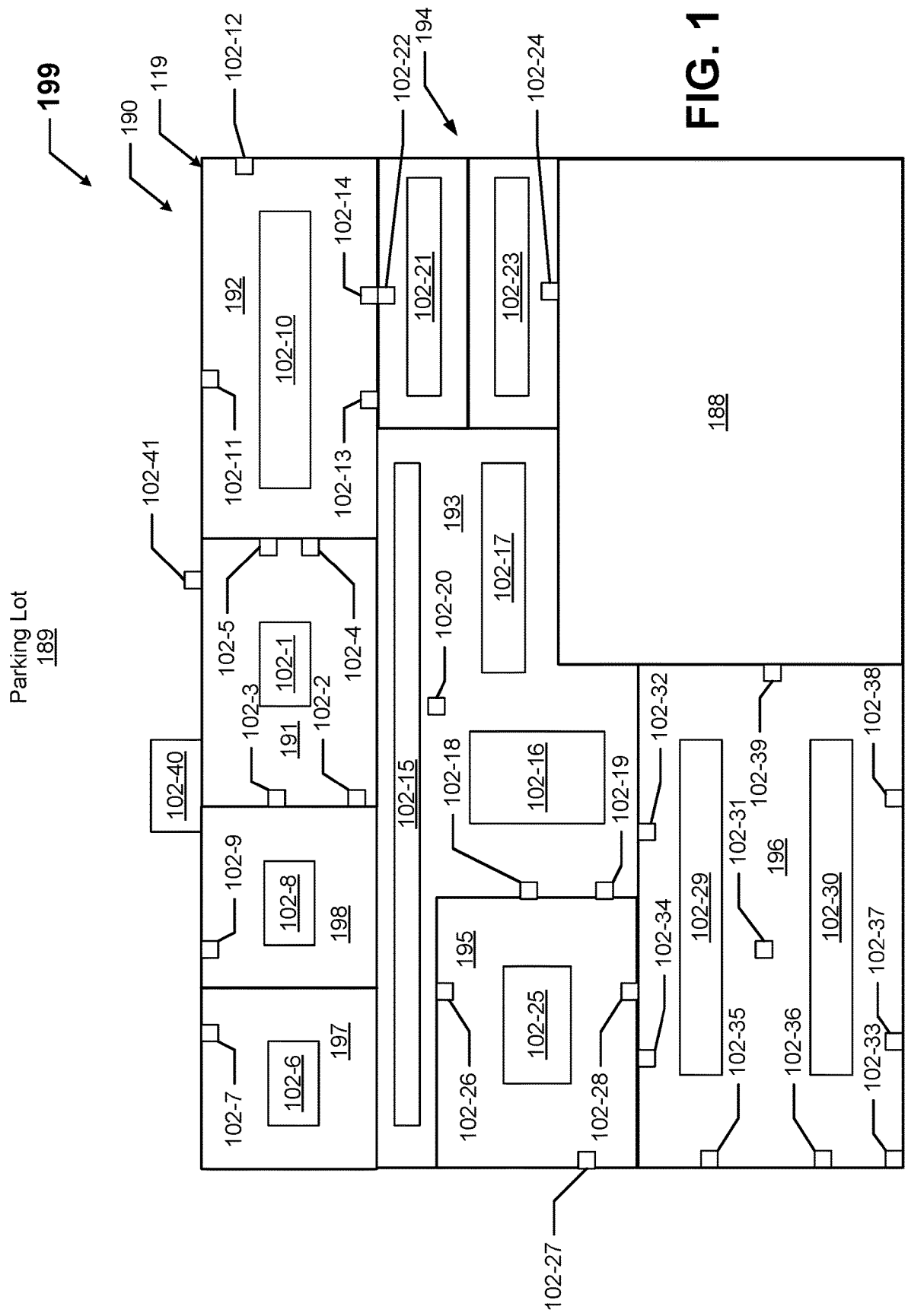
FIG. 1 shows a volume of space having multiple electrical devices in accordance with certain example embodiments.

In general, example embodiments provide systems, methods, and devices for wireless organization of electrical devices by sensor manipulation. Example embodiments can provide a number of benefits. Such benefits can include, but are not limited to, efficient commissioning, ease in grouping of electrical devices used for a common purpose or having common settings, effective energy management of light fixtures and other devices in a space, improved safety, longer useful life of light fixtures and other electrical equipment in a room, reduced operating costs, and compliance with industry standards that apply to light fixtures and other electrical equipment in certain environments.

Example embodiments are directed to wirelessly organizing any of a number of different types of electrical devices. Examples of such electrical devices can include, but are not limited to, a light fixture, a wall outlet, a computer, a printer, an automated window covering (e.g., blinds, drapes), a projector, a control panel, an automated window tinting mechanism, components of a HVAC system (including, for example, a vent and a thermostat), a camera, a sensor device (e.g., a smoke detector, a CO2 monitor), a point-of-load controller, a power distribution module, a clock, and a telephone.

Further, while example embodiments are described, by way of example herein, as being used in a building, example embodiments can also be used in other areas where electrical devices can be located. Such other areas can include, but are not limited to, a parking structure, a parking lot, a street, an outdoor stadium, and a park. Further, when applied to building environments, example embodiments can be used in any part of such building environments. Such parts of a building environment can include, but are not limited to, a small room (individual office, small conference room), a large room (large conference room), a break room, bathrooms, locker rooms, a corridor, a stairwell, an auditorium, a server room, an attic, a basement, a maintenance area, a manufacturing space, a shop floor, a storage room, an inventory space, and an arena.

When an electrical device is a light fixture, the light fixture can use any type of light source (e.g., light-emitting diode (LED), incandescent, sodium vapor, fluorescent). When light sources use LED technology, one or more of any type of LED technology can be included, such as chip-on-board, discrete, arrays, and multicolor.

In the foregoing figures showing example embodiments of wireless organization of electrical devices by sensor manipulation, one or more of the components shown may be omitted, repeated, and/or substituted. Accordingly, example embodiments of wireless organization of electrical devices by sensor manipulation should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number and corresponding components in other figures have the identical last two digits.

In certain example embodiments, light fixtures and/or other electrical equipment used in wireless organization by sensor manipulation herein are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the enclosures of electrical devices described herein.

Example embodiments of wireless organization of electrical devices by sensor manipulation will be described more fully hereinafter with reference to the accompanying drawings, in which example embodiments of wireless organization of electrical devices by sensor manipulation are shown. Wireless organization of electrical devices by sensor manipulation may, however, be embodied in many different forms and should not be construed as limited to the example embodiments set forth herein. Rather, these example embodiments are provided so that this disclosure will be thorough and complete, and will fully convey the scope of wireless organization of electrical devices by sensor manipulation to those of ordinary skill in the art. Like, but not necessarily the same, elements (also sometimes called components) in the various figures are denoted by like reference numerals for consistency.

Terms such as "first", "second", "third", and "within" are used merely to distinguish one component (or part of a component or state of a component) from another. Such terms are not meant to denote a preference or a particular orientation, and such terms are not meant to limit embodiments of wireless organization of electrical devices by sensor manipulation. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
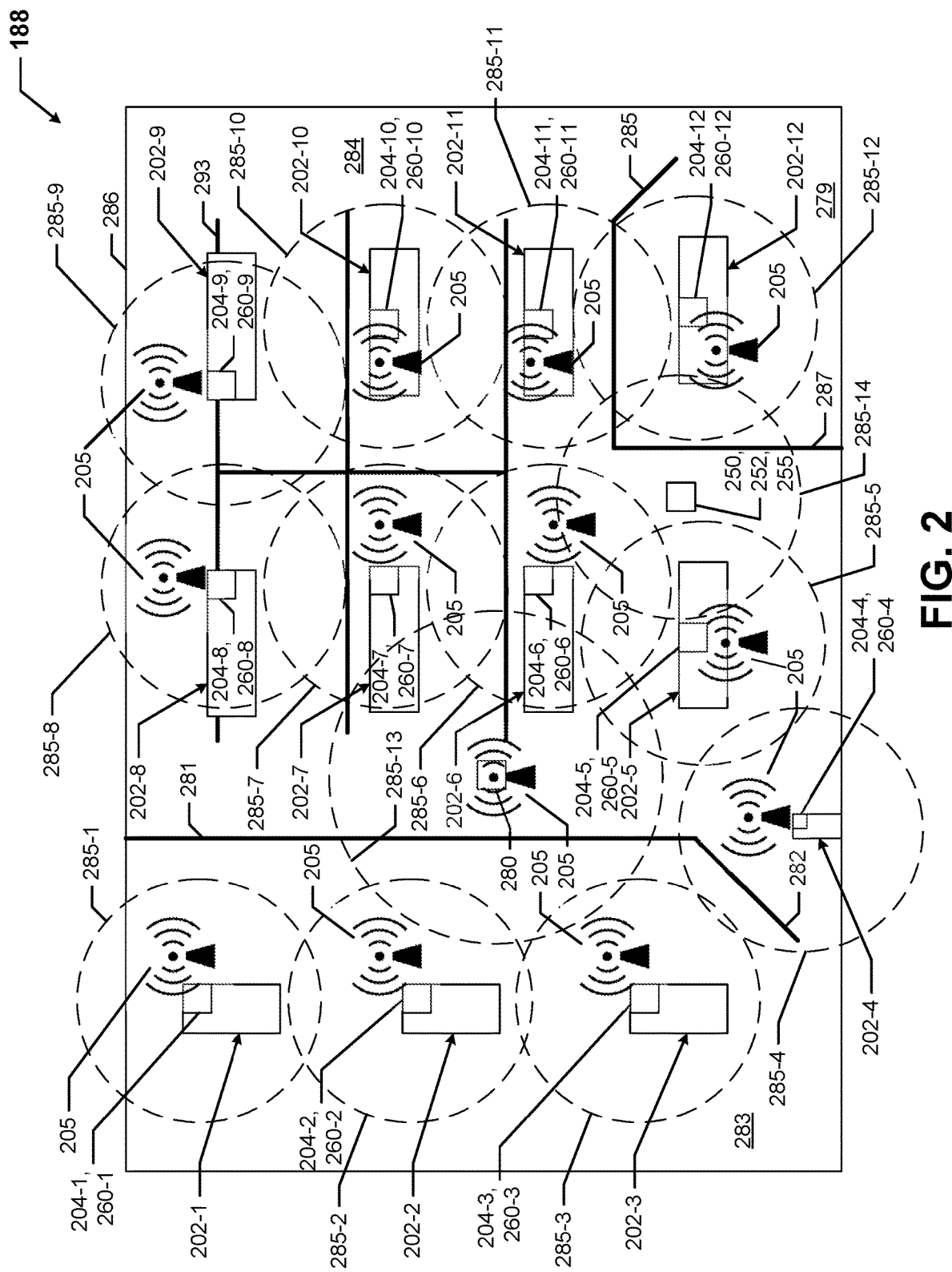
FIG. 2 shows a detail of part of the office space of FIG. 1.

FIG. 1 shows a volume of space 199 that includes multiple electrical devices 102 in accordance with certain example embodiments. The volume of space 199 of FIG. 1 includes a building 190 with an office space 119 inside and a parking lot 189 outside. FIG. 2 shows a detail of the work area 188 of the office space 119 of FIG. 1. The office space 119 includes a number of adjoining rooms. In this case, the office space 119 shown in FIG. 1 includes a reception area 191 that is adjoining to a hallway 193. The hallway 193 leads to restrooms 194, a large office 192, two smaller offices 197 and 198, a conference room 196, a break room 195, and the work area 188.

The work area 188, as shown in FIG. 2, is defined by exterior walls 286 that form the outer perimeter of the work area 188. The work area 188 is divided into a number of areas. For example, a wall 281 and a door 282 separate a hallway 283 from a work space 284. As another example, wall 287 and door 219 define an office 279 within the work area 188 and separate from the work space 284. The work space 284, the hallway 283, and the office 279 are examples of zones that can be created using example embodiments. The parking lot 189, shown in FIG. 1 and part of the volume of space 199, is located outside the office space 119 adjacent to the reception area 191.

Each room of the office space 119 includes one or more of a number of electrical devices 102, 202. The electrical devices 102, 202 shown in FIGS. 1 and 2 are not exclusive and are not meant to be limiting in terms of the number and/or type of electrical devices 102, 202 that can be found in the office space 119. In this case, the reception area 191 includes an electrical device 102-1 in the form of a light fixture, an electrical device 102-2 in the form of a thermostat, two electrical devices 102 (electrical device 102-3 and electrical device 102-4) in the form of electrical receptacles, and an electrical device 102-5 in the form of a security camera. The office 197 in this example includes an electrical device 102-6 in the form of a light fixture and an electrical device 102-7 in the form of an electrical outlet. The office 198 in this example includes an electrical device 102-8 in the form of a light fixture and an electrical device 102-9 in the form of an electrical outlet. The office 192 includes an electrical device 102-10 in the form of a light fixture, three electrical devices 102 (electrical device 102-11, electrical device 102-12, and electrical device 102-14) in the form of electrical outlets, and an electrical device 102-13 in the form of a thermostat.

The hallway 193 in FIG. 1 includes three electrical devices 102 (electrical device 102-15, electrical device 102-16, and electrical device 102-17) in the form of light fixtures, an electrical device 102-18 in the form of an electrical outlet, an electrical device 102-19 in the form of a thermostat, and an electrical device 102-20 in the form of a security camera. The restrooms 194 in this example include two electrical devices (electrical device 102-21 and electrical device 102-23) in the form of light fixtures and two electrical devices 102 (electrical device 102-22 and electrical device 102-24) in the form of electrical outlets. The break room 195 in FIG. 1 includes an electrical device 102-25 in the form of a light fixture and three electrical devices 102 (electrical device 102-26, electrical device 102-27, and electrical device 102-28) in the form of electrical outlets.

The conference room 196 in this example includes two electrical devices 102 (electrical device 102-29 and electrical device 102-30) in the form of light fixtures, an electrical device 102-32 in the form of a thermostat, an electrical device 102-31 in the form of a projector, an electrical device 102-33 in the form of a security camera, and six electrical devices 102 (electrical device 102-34, electrical device 102-35, electrical device 102-36, electrical device 102-37, electrical device 102-38, and electrical device 102-39) in the form of electrical outlets. There can also be one or more electrical devices 102 located outside the building 190. For example, as shown in FIG. 1, there can be an electrical device 102-40 in the form of a light fixture 102-40 and an electrical device 102-41 in the form of a security camera located near the entrance to the reception area 191.

As shown in FIG. 2, the hallway 283 of the work area 188 includes three electrical devices 202 (electrical device 202-1, electrical device 202-2, and electrical device 202-3) in the form of light fixtures. The office 279 of the work space 284 of FIG. 2 includes an electrical device 202-12 in the form of a light fixture. The work space 284 of the work area 188 of FIG. 2 includes an electrical device 202-4 in the form of an illuminated exit sign (a form of light fixture) and seven electrical devices 202 (electrical device 202-5, electrical device 202-6, electrical device 202-7, electrical device 202-8, electrical device 202-9, electrical device 202-10, and electrical device 202-11) in the form of light fixtures. Also located in the work space 284 is a gateway 280 and a user 250 with a user system 255 and a trigger device 252, all of which are described below with respect to FIG. 3.

Each of electrical device 202-1 through electrical device 202-12) in the work area 188 of FIG. 2 includes a controller 204 and a sensor device 260. Further, each controller 204 includes a transceiver (such as transceiver 324 described below with respect to FIG. 3), and each transceiver in this example transmits and receives signals. The user system 255 and the gateway 280 can also include a controller with a transceiver for transmitting signals using communication links 205. These signals are transmitted using the communication links 205 (also defined below with respect to FIG. 3) by which the electrical devices 202, the user system 250, and the gateway 280 communicate with each other. Each transceiver has a range 285 (e.g., 10 meters) that defines a maximum area or volume of space in which the transceiver can send and receive signals.

For example, electrical device 202-1 includes a sensor device 260-1 and a controller 204-1, where the transceiver of the controller 204-1 has a communication range 285-1. Electrical device 202-2 includes a sensor device 260-2 and a controller 204-2, where the transceiver of the controller 204-2 has a communication range 285-2. Electrical device 202-3 includes a sensor device 260-3 and a controller 204-3, where the transceiver of the controller 204-3 has a communication range 285-3. Electrical device 202-4 includes a sensor device 260-4 and a controller 204-4, where the transceiver of the controller 204-4 has a communication range 285-4. Electrical device 202-5 includes a sensor device 260-5 and a controller 204-5, where the transceiver of the controller 204-5 has a communication range 285-5.

Electrical device 202-6 includes a sensor device 260-6 and a controller 204-6, where the transceiver of the controller 204-6 has a communication range 285-6. Electrical device 202-7 includes a sensor device 260-7 and a controller 204-7, where the transceiver of the controller 204-7 has a communication range 285-7. Electrical device 202-8 includes a sensor device 260-8 and a controller 204-8, where the transceiver of the controller 204-8 has a communication range 285-8. Electrical device 202-9 includes a sensor device 260-9 and a controller 204-9, where the transceiver of the controller 204-9 has a communication range 285-9. Electrical device 202-10 includes a sensor device 260-10 and a controller 204-10, where the transceiver of the controller 204-10 has a communication range 285-10.

Electrical device 202-11 includes a sensor device 260-11 and a controller 204-11, where the transceiver of the controller 204-11 has a communication range 285-11. Electrical device 202-12 includes a sensor device 260-12 and a controller 204-12, where the transceiver of the controller 204-12 has a communication range 285-12. The transceiver of the gateway 280 has a communication range 285-13. Finally, the user system 255 and the trigger device 252 each have a communication range 285-14, although the user system 285 and the trigger device 252 can each have different communication ranges 285. In some cases, the trigger device 252 can be integrated with the user system 255. While not shown in FIG. 2 to simplify the figure, to the extent that there are other electrical devices 202 (e.g., electrical outlets, cameras, projectors) in the work area 188, they can also include a controller with a transceiver, where the transceiver has a communication range 285.

A transceiver of an electrical device 202, the user system 255, and/or the gateway 280 can communicate with a transceiver of another electrical device 202, the user system 255, and/or the gateway 280 if the communication range 285 of one transceiver intersects the communication range 285 of another transceiver. In this example, communication range 285-1 intersects communication range 285-2, which intersects communication range 285-3, which intersects communication range 285-4, which intersects communication range 285-5, which intersects range 285-6, which intersects range 285-7, which intersects communication range 285-8, which intersects communication range 285-9, which intersects communication range 285-10, which intersects communication range 285-11, which intersects communication range 285-12. In other words, the controllers 204 of the electrical devices 202 shown in FIG. 2 are communicably coupled to each other, directly or indirectly, in a daisy-chain configuration. In other embodiments, the range 285 of the transceiver of one electrical device 202 can intersect with more than two communication ranges 285 of the transceivers of one or more other electrical device 202.

Further, the communication range 285-13 of the gateway 280 intersects with the range communication 285-2 of electrical device 202-2, the range communication 285-3 of electrical device 202-3, the range communication 285-5 of electrical device 202-5, the communication range 285-6 of electrical device 202-6, and the communication range 285-7 of electrical device 202-7. In addition, the communication range 285-14 of the user system 255 in this example intersects with the communication range 285-5 of electrical device 202-5, the communication range 285-6 of electrical device 202-6, the communication range 285-12 of electrical device 202-12, and the communication range 285-12 of electrical device 202-12. These communication ranges 285 can similarly be expanded or reduced to increase or decrease the number of other electrical devices that are in direct communication.

Each electrical device 202 of FIG. 2 can have no sensor devices 260, a single sensor device 260, or multiple sensor devices 260. In this example, each electrical device 202 of FIG. 2 has a single sensor device 260. Further, for the sake of simplicity with respect to FIG. 1, each electrical device 102 can include at least one sensor, a controller, and a transceiver having a communication range. In this way, all of the electrical devices 102, 202 inside and/or outside the building 190 can be directly or indirectly in communication with each other and with the gateway 180. As explained below with respect to FIG. 3, the communication links (e.g., communication links 205) used in this communication can use wired and/or wireless technology.

Figure 3:
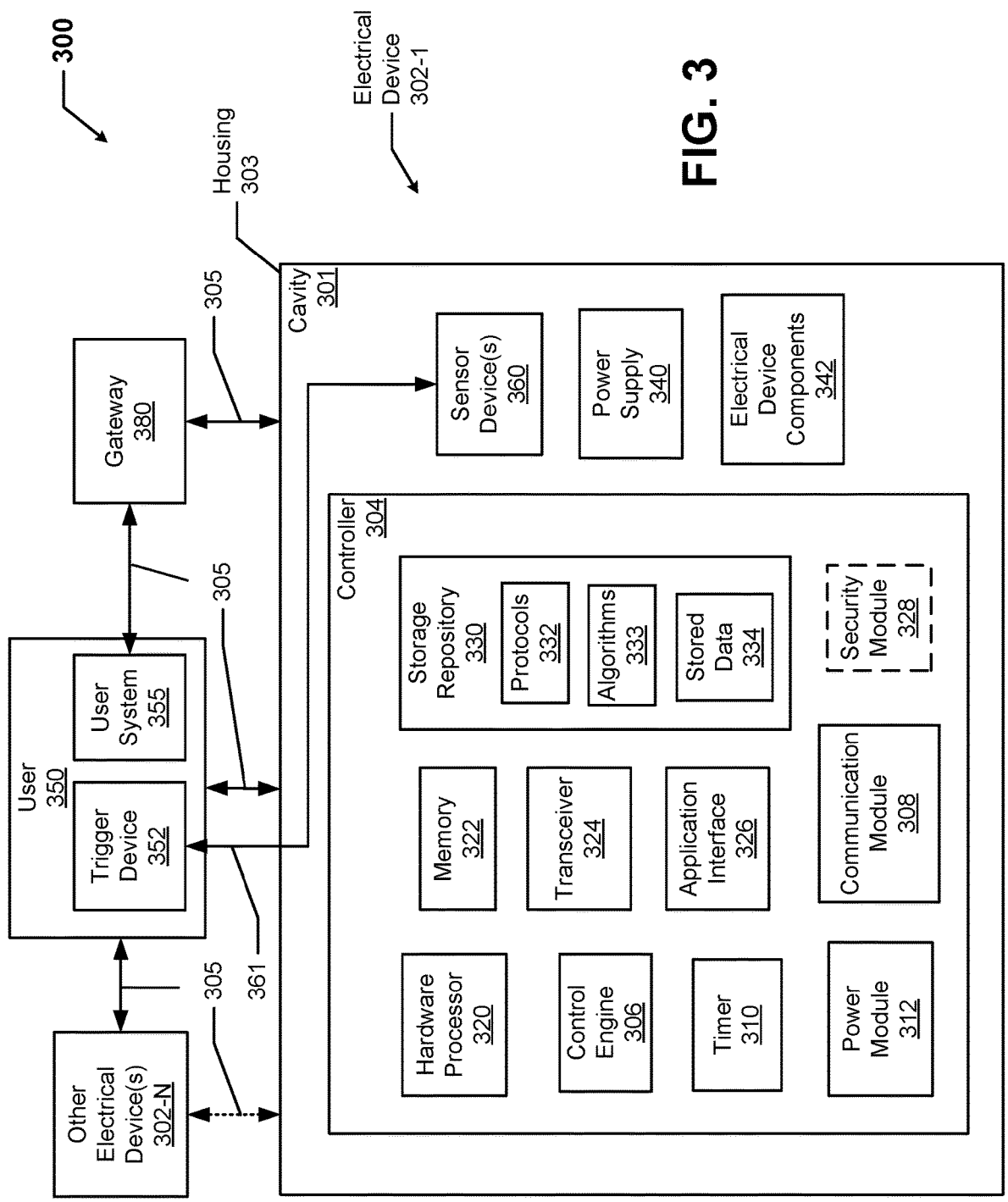
FIG. 3 shows a system in accordance with certain example embodiments.

FIG. 3 shows a system diagram of a system 300 that includes a controller 304 of an electrical device 302-1 in accordance with certain example embodiments. In addition to the electrical device 302-1, the system 300 can include one or more users 350 (where each user 350 can include one or more user systems 355 and, optionally, a trigger device 352), a network manager 380, and one or more optional other electrical devices 302-N. In addition to the controller 304, the electrical device 302-1 can include a power supply 340, a number of electrical device components 342, and one or more sensor devices 360. The controller 304 can include one or more of a number of components. Such components, can include, but are not limited to, a control engine 306, a communication module 308, a timer 310, a power module 312, a storage repository 330, a hardware processor 320, a memory 322, a transceiver 324, an application interface 326, and, optionally, a security module 328.

The components shown in FIG. 3 are not exhaustive, and in some embodiments, one or more of the components shown in FIG. 3 may not be included in the example electrical device 302-1. Any component of the example electrical device 302-1 can be discrete or combined with one or more other components of the electrical device 302-1. The electrical device 302-1 and the one or more other electrical devices 302-N can collectively be referred to as the electrical devices 302 herein.

Referring to FIGS. 1 through 3, a user 350 may be any person that interacts with the electrical devices 302. Examples of a user 350 can include, but are not limited to, an employee, a supervisor, a visitor, an engineer, an electrician, an instrumentation and controls technician, a mechanic, an operator, a consultant, a commissioner, a janitor, a vendor, a manager, a contractor, and a manufacturer's representative. As discussed above, the user 350 can include a trigger device 352. A trigger device 352 is something that the user 350 can employ, activate, or otherwise use to force a sensor device 360 of the electrical device 302-1 to identify itself or otherwise perform a non-standard function, thereby also identifying the electrical device 302-1 from which the sensor device 360 is associated. Examples of a trigger device 352 can include, but are not limited to, a laser pointer, a flashlight, a frequency generator, the person of the user 350 (e.g., making particular gestures, saying a particular phrase), a strobe light, a noise generator (e.g., making noises of a particular frequency, patter, and/or duration), and a whistle. The trigger device 352 can communicate with a sensor device 360 using a communication signal 361.

As discussed below, the standard function of a sensor of a sensor device 360 is to measure one or more parameters (e.g., ambient light, temperature). When the sensor of the sensor device 360 measures such a parameter, those measurements can be used in the operation of the associated electrical device 302-1. For example, if the electrical device 302-1 is a light fixture, and if the of a sensor device sensor 360 measures an amount of ambient light, then the light sources (part of the electrical device components 342) of the light fixture can illuminate when the amount of ambient light measured by the sensor of a sensor device 360 falls below a threshold value.

In some cases, a sensor of a sensor device 360 can also be configured to detect some condition (a type of parameter), aside from the parameters used to operate the electrical device 302-1, that causes the sensor device 360 to take some other action that is unrelated to the direct operation of the electrical device 302-1. For example, a sensor device 360 can be configured to reverse identify (broadcast a signal with its identification information) when a certain condition (e.g., a laser is pointed at the sensor of the sensor device 360 for 4-5 seconds) is met. The trigger device 352 can be used to cause such a condition detected by the sensor of the sensor device 360.

A user 350 can also include one or more user systems 355 (also sometimes called user devices 355 herein). A user system 355 can include a display (e.g., a GUI) and a controller, such as the controller 304 of the electrical device 302-1 described below. Examples of a user system 355 can include, but are not limited to, a personal computer (PC), a laptop, an electronic tablet, a dedicated handheld device, and a mobile phone. The user system 355 can also include software (e.g., an app, a program) that allows a user 350 to establish zones, groups, or other designations for multiple electrical devices 302 in the system 300. For example, the software on a user system 355 can allow a user 350 to have all electrical devices 302 in a particular room (e.g., the conference room 196) to be assigned to a group for some purpose (e.g., designate times when the electrical devices 302 in the group can receive power, download common settings for the electrical devices 302 in the group). As discussed above, the electrical devices 302 that are assigned to a group can be so designated by forcing a sensor device 360 associated with one or more of those electrical devices 302 to take an action (e.g., reverse identification) that is outside of the normal operating mode of the sensor device 360.

In certain example embodiments, a user device 355 can be used to be redefine (e.g., add electrical devices, remove electrical devices, combine existing groups) groups at any time. If there are multiple users 350 that are defining groups using example embodiments, then a hierarchy can be created to determine how conflicts of groups defined by multiple users 350 are be resolved. Also, a level of security (e.g., user identification, password protection) can be added (e.g., using the security module 328 discussed below) to allow access to example embodiments and/or limit access (e.g., only allow a user 350 to group certain electrical devices 302) to example embodiments by a particular user 350. All of this functionality by a user 350 using example embodiments can be performed using an app loaded on a user system 355.

In some cases, a user system 355 of a user 350 interacts with (e.g., sends data to, receives data from) the controller 304 of the electrical device 302-1 via the application interface 326 (described below). A user system 355 of a user 350 can also interact with one or more other electrical devices 302-N, the gateway 380, and/or one or more of one or more of the sensors devices 360. In certain example embodiments, the trigger device 352 is discrete and separate from a user device 355. In such a case, the trigger device 352 may be able to communicate with a user device 355 using one or more communication links 305. Alternatively, the trigger device 352 can be integrated with a user device 355.

Interaction between the user system 355, the trigger device 352, the electrical device 302-1, the other electrical devices 302-N, the gateway 380, and the sensor devices 360 is conducted using communication links 305. Each communication link 305 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a communication link 305 can be (or include) one or more electrical conductors that are coupled to a sensor device 360.

A communication link 305 can transmit signals (e.g., power signals, communication signals, control signals, data) between the controller 304, a user system 355, the gateway 380, the controllers of other electrical devices 302-N, and/or one or more of the sensor devices 360. One or more communication links 305 can also transmit signals between components (e.g., power module 312, control engine 306, storage repository 330) within the controller 304.

The gateway 380 is a device or component that controls all or a portion of the system 300, which can include the controller 304 of the electrical device 302-1, a user system 355 of a user 350, the gateway 380, the other electrical devices 302-N, and the sensor devices 360 that are communicably coupled to the controller 304. The gateway 380 can be substantially similar to, or include some or all of the components of, the controller 304. Alternatively, the gateway 380 can include one or more of a number of features in addition to, or altered from, the features of the controller 304 described below. As described herein, communication with the gateway 380 can include communicating with one or more other components (e.g., another electrical device 302-N) of the system 300. In such a case, the gateway 380 can facilitate such communication.

The other electrical devices 302-N are part of the system 300 with the electrical device 302-1. The other electrical devices 302-N can be substantially the same as the electrical device 302-1 described herein. One or more components of the electrical device 302-1 can be shared with one or more of the other electrical devices 302-N. For example, the controller 304 of the electrical device 302-1 can also control some or all of the other electrical devices 302-N.

The electrical device 302-1 can include one or more sensor devices 360. A sensor device 360 can include one or more sensors. Each sensor of a sensor device 360 can measure one or more parameters. The parameters measured by a sensor of a sensor device 360 may or may not directly affect the operation of the electrical device 302-1 or the other electrical devices 302-N. The parameters can include, but are not limited to, pressure, temperature, carbon monoxide, ambient light, sound, motion, carbon dioxide, smoke, and humidity. As discussed above, in some cases, a sensor of a sensor device 360 can also be configured to detect some condition, aside from such parameters used to operate the electrical device 302-1, that causes the sensor device 360 to take some other action that is unrelated to the direct operation of the electrical device 302-1. For example, a sensor device 360 can be configured to reverse identify (broadcast a signal with its identification information) when a sensor of the sensor device 360 ascertains that a certain condition (e.g., a laser is pointed at it for 4-5 seconds) is met. The trigger device 352 can be used to cause such a condition detected by the sensor device 360.

Examples of types of sensors of a sensor device 360 can include, but are not limited to, a passive infrared sensor, a photocell, a differential pressure sensor, a humidity sensor, a pressure sensor, an air flow monitor, a gas detector, a vibration sensor, and a resistance temperature detector. In addition to at least one sensor, a sensor device 360 can include one or more of a number of components. For example, a sensor device 360 can include a controller (or components thereof) that is substantially similar to the controller 304 (or components thereof) of the electrical device 302-1, as described below. For example, if a sensor device 360 has communication capabilities, then the sensor device 360 can use one or more of a number of communication protocols. A sensor device 360 can be associated with the electrical device 302-1 and/or one or more other electrical devices 302-N in the system 300.

A user system 355 of a user 350, the gateway 380, the other electrical devices 302-N, and/or the sensor devices 360 can interact with the controller 304 of the electrical device 302-1 using the application interface 326 in accordance with one or more example embodiments. Specifically, the application interface 326 of the controller 304 receives data (e.g., information, communications, instructions, updates to firmware) from and sends data (e.g., information, communications, instructions) to a user system 355 of a user 350, the gateway 380, the other electrical devices 302-N, and/or each sensor device 360. A user system 355 of a user 350, the gateway 380, the other electrical devices 302-N, and/or each sensor device 360 can include an interface to receive data from and send data to the controller 304 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 304, a user system 355 of a user 350, the gateway 380, the other electrical devices 302-N, and/or the sensor devices 360 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 304. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 4.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 300.

The electrical device 302-1 can include a housing 303. The housing 303 can include at least one wall that forms a cavity 301. In some cases, the housing 303 can be designed to comply with any applicable standards so that the electrical device 302-1 can be located in a particular environment. The housing 303 can take any form suitable for the electrical device 302-1. For example, when the electrical device 302-1 is a light fixture, the housing 303 can form any type of light fixture, including but not limited to a troffer light fixture, a down can light fixture, a recessed light fixture, and a pendant light fixture. When the electrical device 302-1 is multi-functional, the housing 303 can be configured to combine those functions. For example, the electrical device 302-1 can be a ceiling fan with a light. As another example, the electrical device 302-1 can be a garage door opener with a light.

The housing 303 of the electrical device 302-1 can be used to house one or more components of the electrical device 302-1, including one or more components of the controller 304. For example, as shown in FIG. 3, the controller 304 (which in this case includes the control engine 306, the communication module 308, the timer 310, the power module 312, the storage repository 330, the hardware processor 320, the memory 322, the transceiver 324, the application interface 326, and the optional security module 328), the power supply 340, the electrical device components 342, and one or more sensor devices 360 are disposed in the cavity 301 formed by the housing 303. In alternative embodiments, any one or more of these or other components (e.g., a sensor device 360) of the electrical device 302-1 can be disposed on the housing 303 and/or remotely from the housing 303.

The storage repository 330 can be a persistent storage device (or set of devices) that stores software and data used to assist the controller 304 in communicating with a user system 355 of a user 350, the gateway 380, the other electrical devices 302-N, and one or more sensor devices 360 within the system 300. In one or more example embodiments, the storage repository 330 stores one or more protocols 332, algorithms 333, and stored data 334. The protocols 332 can be one or more of any number of procedures (e.g., a series of method steps) and/or other similar operational procedures that the control engine 306 of the controller 304 follows based on certain conditions at a point in time.

The protocols 332 can include one or more protocols used for communication. The protocols 332 used for communication can be used to send and/or receive data between the controller 304 and a user system 355 of a user 350, the gateway 380, the other electrical devices 302-N, and one or more sensor devices 360. One or more of the protocols 332 used for communication can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the protocols 332 used for communication can provide a layer of security to the data transferred within the system 300.

An example of a protocol 332 is receiving a communication from a sensor device 360 that the sensor device 360 is reverse identifying based on a communication 361 received by the sensor device 360 from a trigger device 352 of a user 350. In such a case, the protocol 332 can require the control engine 306 to initiate a communication with the gateway 380 about the reverse identification. Another example of a protocol 332 is calibrating and/or resetting a sensor 360 device after the sensor 360 device has reverse identified. Yet another example of a protocol 332 is using the control engine 306, with instructions from the gateway 380, to assign the electrical device 302-1 into a virtual zone or group when a sensor device 360 has reverse identified.

Still another example of a protocol 332 is to check one or more communication links 305 with the gateway 380 and, if a communication link 305 is not functioning properly, allow the controller 304 to operate autonomously from the rest of the system 300. As another example of a protocol 332, configurations of the controller 304 can be stored in memory 322 (e.g., non-volatile memory) so that the controller 304 (or portions thereof) can operate regardless of whether the controller 304 is communicating with the gateway 380 and/or other components in the system 300. Yet another example of a protocol 332 is to have the controller 304 operate in an autonomous control mode if one or more components (e.g., the communication module 308, the transceiver 324) of the controller 304 that allows the controller 304 to communicate with another component of the system 300 fails.

The algorithms 333 can be any models, formulas, and/or other similar operational implementations that the control engine 306 of the controller 304 uses. An algorithm 333 can at times be used in conjunction with a protocol 332. Stored data 334 can be any historical, present, and/or forecast data. Stored data 334 can be associated with a sensor 360, any electrical device components 342, the power supply 340, the controller 304, the gateway 380, a trigger device 352, and a user system 355 of a user 350. Such stored data 334 can include, but is not limited to, settings, threshold values, default values, user preferences, results of an algorithm, modifications to a protocol 132, capabilities of a light source (and/or other electrical device component 342), a manufacturer of a sensor device 360, a model number of a sensor device 360, and measurements taken by a sensor device 360.

Examples of a storage repository 330 can include, but are not limited to, a database (or a number of databases), a file system, a hard drive, flash memory, some other form of solid state data storage, cloud-based storage, or any suitable combination thereof. The storage repository 330 can be located on multiple physical machines, each storing all or a portion of the protocols 332, the algorithms 333, and/or the stored data 334 according to some example embodiments. Each storage unit or device can be physically located in the same or in a different geographic location.

The storage repository 330 can be operatively connected to the control engine 306. In one or more example embodiments, the control engine 306 includes functionality to communicate with a user system 355 of the a 350, the gateway 380, the other electrical devices 302-N, and the sensor devices 360 in the system 300. More specifically, the control engine 306 sends information to and/or receives information from the storage repository 330 in order to communicate with a user system 355 of a user 350, the gateway 380, the other electrical devices 302-N, and the sensor devices 360. As discussed below, the storage repository 330 can also be operatively connected to the communication module 308 in certain example embodiments.

In certain example embodiments, the control engine 306 of the controller 304 controls the operation of one or more components (e.g., the communication module 308, the timer 310, the transceiver 324) of the controller 304. For example, the control engine 306 can activate the communication module 308 when the communication module 308 is in "sleep" mode and when the communication module 308 is needed to send data received from another component (e.g., a sensor device 360, the gateway 380) in the system 300. As another example, the control engine 306 can operate one or more sensor devices 360 to dictate when measurements are taken by one or more sensors of a sensor device 360 and when those measurements are communicated by the sensor device 360 to the control engine 306. As another example, the control engine 306 can acquire the current time using the timer 310. The timer 310 can enable the controller 304 to control the electrical device 302-1 even when the controller 304 has no communication with the gateway 380.

As another example, the control engine 306 can check one or more communication links 305 between the controller 304 and the gateway 380 and, if a communication link 305 is not functioning properly, allow the controller 304 to operate autonomously from the rest of the system 300. As yet another example, the control engine 306 can store configurations of the controller 304 (or portions thereof) in memory 322 (e.g., non-volatile memory) so that the controller 304 (or portions thereof) can operate regardless of whether the controller 304 is communicating with the network controller 380 and/or other components in the system 300.

As still another example, the control engine 306 can determine that a sensor device 360 is reverse identifying based on a communication 361 received by a sensor of the sensor device 360 from a trigger device 352 of the user 350. For example, if the trigger device 352 is a laser pointer, and if a sensor of a sensor device 360 is a daylight sensor, the sensor device 360 may be configured in such that, if a laser from the trigger device 352 is continuously directed at the sensor of the sensor device 360 by a user 350 for 4 or 5 seconds, then the sensor device 360 is programmed to reverse identify.

In such a case, when the sensor device 360 is integrated with or otherwise associated with the electrical device 302-1, the control engine 306 of the controller 304 of the electrical device 302-1 can initiate a communication with the gateway 380 about the reverse identification of the sensor device 360. Alternatively, if the sensor device 360 is a stand-alone component of the system 300, then the equivalent of a control engine of the sensor device 360 can initiate a communication with the gateway 380 about the reverse identification of the sensor device 360. When a sensor device 360 is a stand-alone component of the system 300, then the sensor device 360 can be considered an electrical device 302.

In other words, a user 350 uses the trigger device 352 to force the system 300 (e.g., through the gateway 380, through the controller 304 of the electrical device 302-1) to organize specific electrical devices 302 in a particular way. This type of assignment can be helpful in a number of applications, such as expediting the commissioning of the electrical devices 302 in the system 300 and downloading common settings to electrical devices 302 in the virtual group or zone. For instance, if a user 350 has an app related to the system 300 loaded onto an associated user system 355, when the app is open, a zone can be populated by the user 350, using the trigger device 352 and in conjunction with the gateway 380 and/or one or more controllers 304, by forcing a sensor device 360 of each electrical device 302 assigned to that zone to reverse identify.

As yet another example, the control engine 306, with instructions from the gateway 380, can assign the electrical device 302-1 into a virtual zone or group when a sensor device 360 has reverse identified. As another example, the control engine 306 can obtain readings from an adjacent sensor device 360 (as from another electrical device 302-N or a stand-alone sensor device 360) if the sensor device 360 associated with the electrical device 302-1 malfunctions, if the communication link 305 between the sensor device 360 and the controller 304 fails, and/or for any other reason that the readings of the sensor device 360 associated with the electrical device 302-1 fails to reach the controller 304.

To accomplish this, for example, the gateway 380 or some other controller (e.g., of a sensor device 360, of one of the other electrical devices 302-N) can instruct, upon a request from the control engine 306, the adjacent sensor device 360 to communicate its readings (including reverse identification) to the control engine 306 of the controller 304 using communication links 305. As still another example, the control engine 306 can cause the controller 304 to operate in an autonomous control mode if one or more components (e.g., the communication module 308, the transceiver 324) of the controller 304 that allows the controller 304 to communicate with another component of the system 300 fails.

The control engine 306 can provide control, communication, and/or other similar signals to a user system 355 of a user 350, the gateway 380, the other electrical devices 302-N, and one or more of the sensor devices 360. Similarly, the control engine 306 can receive control, communication, and/or other similar signals from a user system 355 of a user 350, the gateway 380, the other electrical devices 302-N, and one or more of the sensor devices 360. The control engine 306 can control each sensor device 360 automatically (for example, based on one or more algorithms stored in the storage repository 330) and/or based on control, communication, and/or other similar signals received from another device through a communication link 305. The control engine 306 may include a printed circuit board, upon which the hardware processor 320 and/or one or more discrete components of the controller 304 are positioned.

In certain example embodiments, the control engine 306 can include an interface that enables the control engine 306 to communicate with one or more components (e.g., power supply 340) of the electrical device 302-1. For example, if the power supply 340 of the electrical device 302-1 operates under IEC Standard 62386, then the power supply 340 can include a digital addressable lighting interface (DALI). In such a case, the control engine 306 can also include a DALI to enable communication with the power supply 340 within the electrical device 302-1. Such an interface can operate in conjunction with, or independently of, the protocols 332 used to communicate between the controller 304 and a user system 355 of a user 350, the gateway 380, the other electrical devices 302-N, and the sensor devices 360.

The control engine 306 (or other components of the controller 304) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I²C), and a pulse width modulator (PWM).

The communication module 308 of the controller 304 determines and implements the communication protocol (e.g., from the protocols 332 of the storage repository 330) that is used when the control engine 306 communicates with (e.g., sends signals to, receives signals from) a user system 355 of a user 350, the gateway 380, the other electrical devices 302-N, and/or one or more of the sensor devices 360. In some cases, the communication module 308 accesses the stored data 334 to determine which communication protocol is used to communicate with a sensor device 360 associated with the stored data 334. In addition, the communication module 308 can interpret the protocol 332 of a communication received by the controller 304 so that the control engine 306 can interpret the communication.

The communication module 308 can send and receive data between the gateway 380, the other electrical devices 302-N, the sensor devices 360, and/or the user system of the users 350 and the controller 304. The communication module 308 can send and/or receive data in a given format that follows a particular protocol 332. The control engine 306 can interpret the data packet received from the communication module 308 using the protocol 332 information stored in the storage repository 330. The control engine 306 can also facilitate the data transfer between one or more sensor devices 360 and the gateway 380, the other electrical devices 302-N, and/or a user system 355 of a user 350 by converting the data into a format understood by the communication module 308.

The communication module 308 can send data (e.g., protocols 332, algorithms 332, stored data 334, operational information, error codes, threshold values) directly to and/or retrieve data directly from the storage repository 330. Alternatively, the control engine 306 can facilitate the transfer of data between the communication module 308 and the storage repository 330. The communication module 308 can also provide encryption to data that is sent by the controller 304 and decryption to data that is received by the controller 304. The communication module 308 can also provide one or more of a number of other services with respect to data sent from and received by the controller 304. Such services can include, but are not limited to, data packet routing information and procedures to follow in the event of data interruption.

The timer 310 of the controller 304 can track clock time, intervals of time, an amount of time, and/or any other measure of time. The timer 310 can also count the number of occurrences of an event, whether with or without respect to time. Alternatively, the control engine 306 can perform the counting function. The timer 310 is able to track multiple time measurements concurrently. The timer 310 can track time periods based on an instruction received from the control engine 306, based on an instruction received from a user system of a user 350, based on an instruction programmed in the software for the controller 304, based on some other condition or from some other component, or from any combination thereof.

The timer 310 can be configured to track time when there is no power delivered to the controller 304 (e.g., the power module 312 malfunctions) using, for example, a super capacitor or a battery backup. In such a case, when there is a resumption of power delivery to the controller 304, the timer 310 can communicate any aspect of time to the controller 304. In such a case, the timer 310 can include one or more of a number of components (e.g., a super capacitor, an integrated circuit) to perform these functions.

The power module 312 of the controller 304 provides power to one or more other components (e.g., timer 310, control engine 306) of the controller 304. In addition, in certain example embodiments, the power module 312 can provide power (e.g., secondary power) to the power supply 340 of the electrical device 302-1. The power module 312 can include one or more of a number of single or multiple discrete components (e.g., transistor, diode, resistor), and/or a microprocessor. The power module 312 may include a printed circuit board, upon which the microprocessor and/or one or more discrete components are positioned. In some cases, the power module 312 can include one or more components that allow the power module 312 to measure one or more elements of power (e.g., voltage, current) that is delivered to and/or sent from the power module 312.

The power module 312 can include one or more components (e.g., a transformer, a diode bridge, an inverter, a converter) that receives power (for example, through an electrical cable) from the power supply 340 and/or a source external to the electrical device 302-1. The power module 312 can use this power to generate power of a type (e.g., alternating current, direct current) and level (e.g., 12V, 24V, 120V) that can be used by the other components of the controller 304. In addition, or in the alternative, the power module 312 can be or include a source of power in itself to provide signals to the other components of the controller 304 and/or the power supply 340. For example, the power module 312 include a battery or other form of energy storage device. As another example, the power module 312 can be or include a localized photovoltaic solar power system.

In certain example embodiments, the power module 312 of the controller 304 can also provide power and/or control signals, directly or indirectly, to one or more of the sensor devices 360. In such a case, the control engine 306 can direct the power generated by the power module 312 to the sensor devices 360 and/or the power supply 340 of the electrical device 302-1. In this way, power can be conserved by sending power to the sensor devices 360 and/or the power supply 340 of the electrical device 302-1 when those devices need power, as determined by the control engine 306.

The hardware processor 320 of the controller 304 executes software, algorithms (e.g., algorithms 333), and firmware in accordance with one or more example embodiments. Specifically, the hardware processor 320 can execute software on the control engine 306 or any other portion of the controller 304, as well as software used by a user system 355 of a user 350, the gateway 380, the other electrical devices 302-N, and/or one or more of the sensor devices 360. The hardware processor 320 can be an integrated circuit, a central processing unit, a multi-core processing chip, SoC, a multi-chip module including multiple multi-core processing chips, or other hardware processor in one or more example embodiments. The hardware processor 320 is known by other names, including but not limited to a computer processor, a microprocessor, and a multi-core processor.

In one or more example embodiments, the hardware processor 320 executes software instructions stored in memory 322. The memory 322 includes one or more cache memories, main memory, and/or any other suitable type of memory. The memory 322 can include volatile and/or non-volatile memory. The memory 322 is discretely located within the controller 304 relative to the hardware processor 320 according to some example embodiments. In certain configurations, the memory 322 can be integrated with the hardware processor 320.

In certain example embodiments, the controller 304 does not include a hardware processor 320. In such a case, the controller 304 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 304 (or portions thereof) to be programmable and function according to certain logic rules and thresholds without the use of a hardware processor. Alternatively, FPGAs, IGBTs, ICs, and/or similar devices can be used in conjunction with one or more hardware processors 320.

The transceiver 324 of the controller 304 can send and/or receive control and/or communication signals. Specifically, the transceiver 324 can be used to transfer data between the controller 304 and a user system 355 of a user 350, the gateway 380, the other electrical devices 302-N, and/or the sensor devices 360. The transceiver 324 can use wired and/or wireless technology. The transceiver 324 can be configured in such a way that the control and/or communication signals sent and/or received by the transceiver 324 can be received and/or sent by another transceiver that is part of the a system 355 of a user 350, the gateway 380, the other electrical devices 302-N, and/or the sensor devices 360. The transceiver 324 can use any of a number of signal types, including but not limited to radio frequency signals and visible light signals.

When the transceiver 324 uses wireless technology, any type of wireless technology can be used by the transceiver 324 in sending and receiving signals. Such wireless technology can include, but is not limited to, Wi-Fi, Zigbee, visible light communication, cellular networking, and Bluetooth. The transceiver 324 can use one or more of any number of suitable protocols 332 for communication (e.g., ISA100, HART) when sending and/or receiving signals. Such communication protocols can be stored in the protocols 332 of the storage repository 330. Further, any transceiver information for a user system 355 of a user 350, the gateway 380, the other electrical devices 302-N, and/or the sensor devices 360 can be part of the protocols 332 (or other areas) of the storage repository 330.

Optionally, in one or more example embodiments, the security module 328 secures interactions between the controller 304, a user system 355 of a user 350, the gateway 380, the other electrical devices 302-N, and/or the sensor devices 360. More specifically, the security module 328 authenticates communication from software based on security keys verifying the identity of the source of the communication. For example, user software may be associated with a security key enabling the software of a user system 355 of a user 350 to interact with the controller 304 and/or the sensor devices 360. Further, the security module 328 can restrict receipt of information, requests for information, and/or access to information in some example embodiments.

As mentioned above, aside from the controller 304 and its components, the electrical device 302-1 can include one or more sensor devices 360, a power supply 340, and one or more electrical device components 342. The sensor devices 360 are described above. The electrical device components 342 of the electrical device 302-1 are devices and/or components typically found in an electrical device 302-1 to allow electrical device 302-1 to operate. The electrical device components 342 can be electrical, mechanical, electro-mechanical, or electronic. For example, if the electrical device 302-1 is a light fixture, then examples of electrical device components 342 can include, but are not limited to, a light source, a heat sink, a terminal block, a wire, a lens, a reflector, a bezel, an air moving device, a baffle, a circuit board, and an energy storage device.

The power supply 340 of the electrical device 302-1 receives power (e.g., primary power, secondary power) from an external source (e.g., a wall outlet, an energy storage device). The power supply 340 uses the power it receives to generate and provide power (called also final power herein) to the power module 312 of the controller 304, the sensor devices 360, and one or more of the electrical device components 342. The power supply 340 can be called by any of a number of other names, depending on the electrical device 302-1. For example, if the electrical device 302-1 is a light fixture, then the power supply 340 can be called, for example, a driver, a LED driver, and a ballast. The power supply 340 can include one or more of a number of single or multiple discrete components (e.g., transistor, diode, resistor), and/or a microprocessor. The power supply 340 may include a printed circuit board, upon which the microprocessor and/or one or more discrete components are positioned, and/or a dimmer.

In some cases, the power supply 340 can include one or more components (e.g., a transformer, a diode bridge, an inverter, a converter) that receives power (for example, through an electrical cable) from the power module 312 of the controller 304 and generates power of a type (e.g., alternating current, direct current) and level (e.g., 12V, 24V, 120V) that can be used by sensor devices 360 and/or the electrical device components 342. In addition, or in the alternative, the power supply 340 can be a source of power in itself. For example, the power supply 340 can or include be a battery, a localized photovoltaic solar power system, or some other source of independent power.

As stated above, the electrical device 302-1 can be placed in any of a number of environments. In such a case, the housing 303 of the electrical device 302-1 can be configured to comply with applicable standards for any of a number of environments. For example, the electrical device 302-1 can be rated as a Division 1 or a Division 2 enclosure under NEC standards. Similarly, any of the sensor devices 360 or other devices communicably coupled to the electrical device 302-1 can be configured to comply with applicable standards for any of a number of environments. For example, a sensor device 360 that is communicably coupled to but remotely located from the light fixture 302-1 can be rated as a Division 1 or a Division 2 enclosure under NEC standards.

Figure 4:
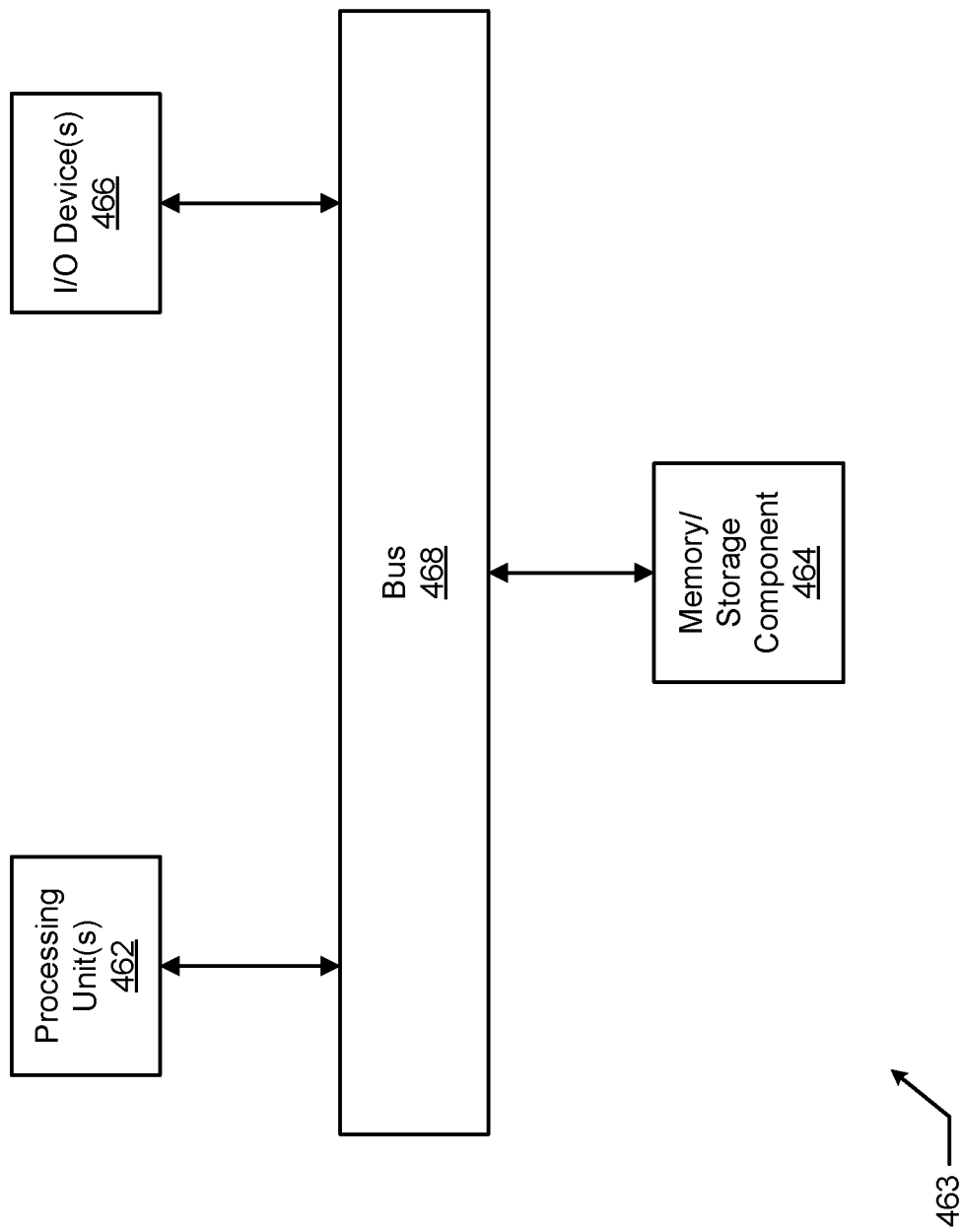
FIG. 4 shows a computing device in accordance with certain example embodiments.

FIG. 4 illustrates one embodiment of a computing device 463 that implements one or more of the various techniques described herein, and which is representative, in whole or in part, of the elements described herein pursuant to certain exemplary embodiments. For example, the control engine 306, the storage repository 330, the memory 322, the communication module 308, and the transceiver 324 of the electrical device 302-1 of FIG. 3 can be considered part of a computing device 463. Computing device 463 is one example of a computing device and is not intended to suggest any limitation as to scope of use or functionality of the computing device and/or its possible architectures. Neither should computing device 463 be interpreted as having any dependency or requirement relating to any one or combination of components illustrated in the example computing device 463.

Computing device 463 includes one or more processors or processing units 462, one or more memory/storage components 464, one or more input/output (I/O) devices 466, and a bus 468 that allows the various components and devices to communicate with one another. Bus 468 represents one or more of any of several types of bus structures, including a memory bus or memory controller, a peripheral bus, an accelerated graphics port, and a processor or local bus using any of a variety of bus architectures. Bus 468 includes wired and/or wireless buses.

Memory/storage component 464 represents one or more computer storage media. Memory/storage component 464 includes volatile media (such as random access memory (RAM)) and/or nonvolatile media (such as read only memory (ROM), flash memory, optical disks, magnetic disks, and so forth). Memory/storage component 464 includes fixed media (e.g., RAM, ROM, a fixed hard drive, etc.) as well as removable media (e.g., a Flash memory drive, a removable hard drive, an optical disk, and so forth).

One or more I/O devices 466 allow a customer, utility, or other user to enter commands and information to computing device 463, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 463 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 463 includes at least the minimal processing, input, and/or output means necessary to practice one or more embodiments.

Further, those skilled in the art will appreciate that one or more elements of the aforementioned computer device 463 is located at a remote location and connected to the other elements over a network in certain exemplary embodiments. Further, one or more embodiments is implemented on a distributed system having one or more nodes, where each portion of the implementation (e.g., control engine 306) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

FIGS. 5-9 show an example of how example embodiments can be implemented. Specifically, FIGS. 5-9 show the work area 188 of FIG. 2. FIGS. 5-9 omit the various communication links 205 and communication ranges 285 of FIG. 2 to better illustrate the example, but the communication links 205 and communication ranges 285 of FIG. 2 apply to FIGS. 5-9.

Figure 5:
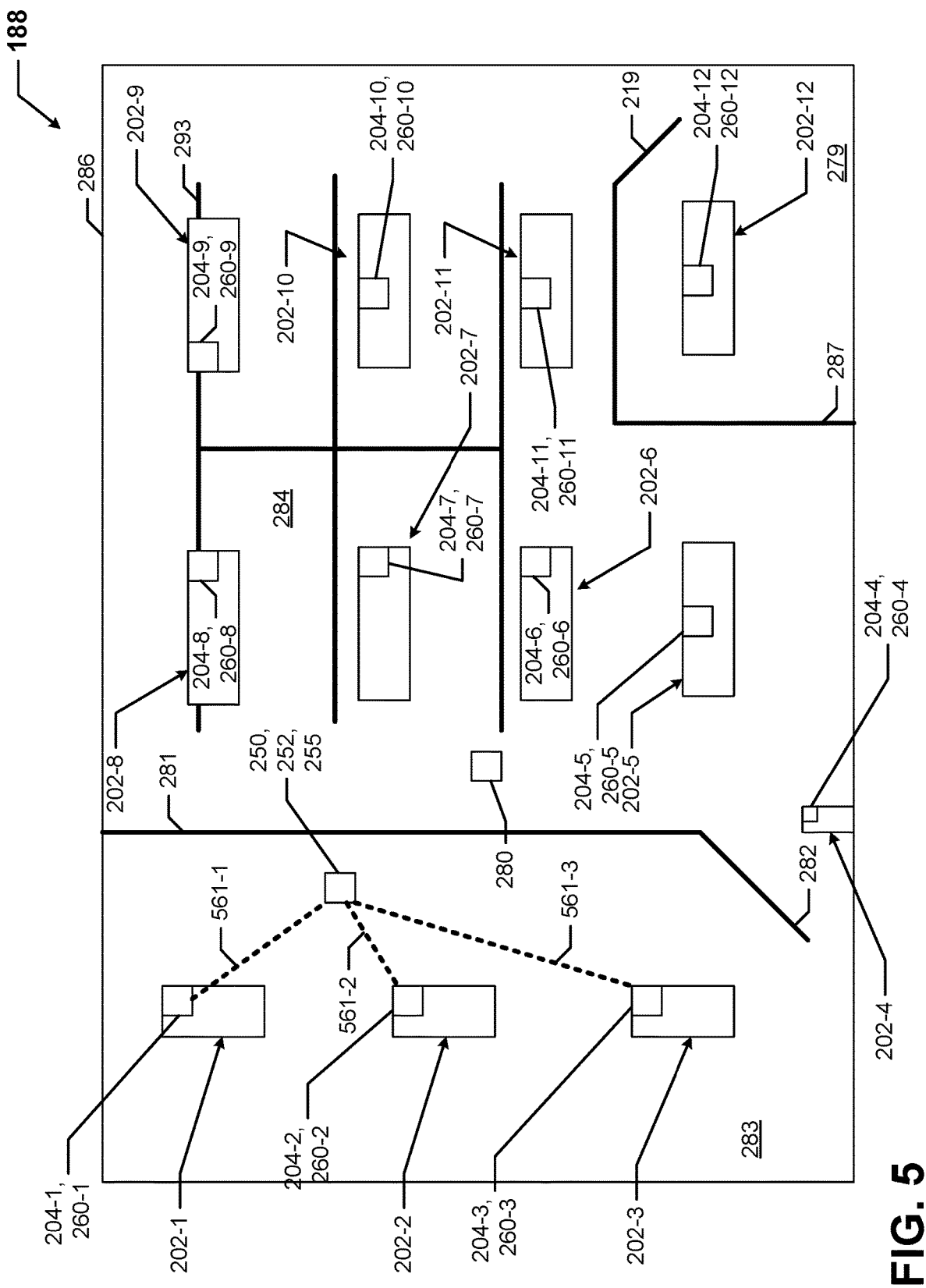
FIGS. 5-9 show an example of how example embodiments can be implemented.

Referring to FIGS. 1 through 9, the work area 188 of FIG. 5 shows a point in time where a user 250 is in the hallway 283 of the work area 188. While in the hallway 283, the user 250 operates the trigger device 252 while directing the trigger device 252 at sensor device 260-1 of electrical device 202-1, at sensor device 260-2 of electrical device 202-2, and at sensor device 260-3 of electrical device 202-3. When this is done, sensor device 260-1, sensor device 260-2, and sensor device 260-3 recognize a condition that triggers an action by sensor device 260-1, sensor device 260-2, and sensor device 260-3. Such an action can be, for example, sensor device 260-1, sensor device 260-2, and sensor device 260-3 self-identifying.

Depending on the operation of the trigger device 252 and the configuration of the sensor device 260, the trigger device 252 is directed at each sensor device 260 in the hallway 283 individually to send a communication signal 561 that, when received by the sensor device 260, triggers a condition of the sensor devices 260 in the hallway 283. Alternatively, a communication signal 561 of the trigger device 252 can be broadcast within the hallway 283 in order for the condition to be recognized by the sensor devices 260 in the hallway 283. In some cases, a line of sight (a very narrow communication range) is required between the trigger device 252 and a sensor device 260 to recognize the condition triggered by the trigger device 252. Alternatively, the sensor devices 260 must be within some other broader communication range (e.g., communication range 285-14 in FIG. 2) of the trigger device 252.

In this example, the trigger device 252 sends a communication signal 561 directly to each sensor device 260 individually. Specifically, the trigger device 252 sends communication signal 561-1 directly to sensor device 260-1, which causes sensor device 260-1 to self-identify. Separately, the trigger device 252 sends communication signal 561-2 directly to sensor device 260-2, which causes sensor device 260-2 to self-identify. Also, separately, the trigger device 252 sends communication signal 561-3 directly to sensor device 260-3, which causes sensor device 260-3 to self-identify.

In any case, when sensor device 260-1, sensor device 260-2, and sensor device 260-3 act (e.g., self-identify) based on the condition initiated by the trigger device 252 in the hallway 283, the user 250 can assign electrical device 202-1 (corresponding to sensor device 260-1), electrical device 202-2 (corresponding to sensor device 260-2), and electrical device 202-3 (corresponding to sensor device 260-3) to a group using an app on the user device 255. By assigning electrical device 202-1, electrical device 202-2, and electrical device 202-3 to a common group, commissioning instructions sent to one of those electrical devices 202 (e.g., electrical device 202-2) in the hallway 283 can be shared by that electrical device with the remainder of the electrical devices (e.g., electrical device 202-1 and electrical device 202-3).

Similarly, if there are operational instructions or other settings that need to be pushed to the electrical devices 202 in the hallway 283, the gateway 280 or other controller can send those instructions to one of those electrical devices (e.g., electrical device 202-1), and that electrical device automatically shares the instructions with the remaining electrical devices (e.g., electrical device 202-2 and electrical device 202-3). The app on the user device 255 can communicate with the gateway 280, either directly or through one or more electrical devices 202.

When a sensor device 260 (e.g., sensor device 260-1) acts based on the condition, the sensor device 260 itself can send a signal (e.g., a communication signal 195) that includes its identification. Alternatively, when the sensor device 260 acts based on the condition, the controller 204 of the associated electrical device 202 can send a communication signal that includes the identification of the electrical device 202 and/or the associated sensor device 260. In any case, the communication signal that is sent by the sensor device 260 and/or the associated electrical device 202 and that includes the identification of the sensor device 260 and/or the associated electrical device 202 can be received (directly or indirectly) by the gateway 280 and/or by the user device 255. When the user 250, through the user device 255, assigned that electrical device 202 to a group, that assignment can be sent by the user device 255, directly or indirectly, to the gateway 280.

Figure 6:
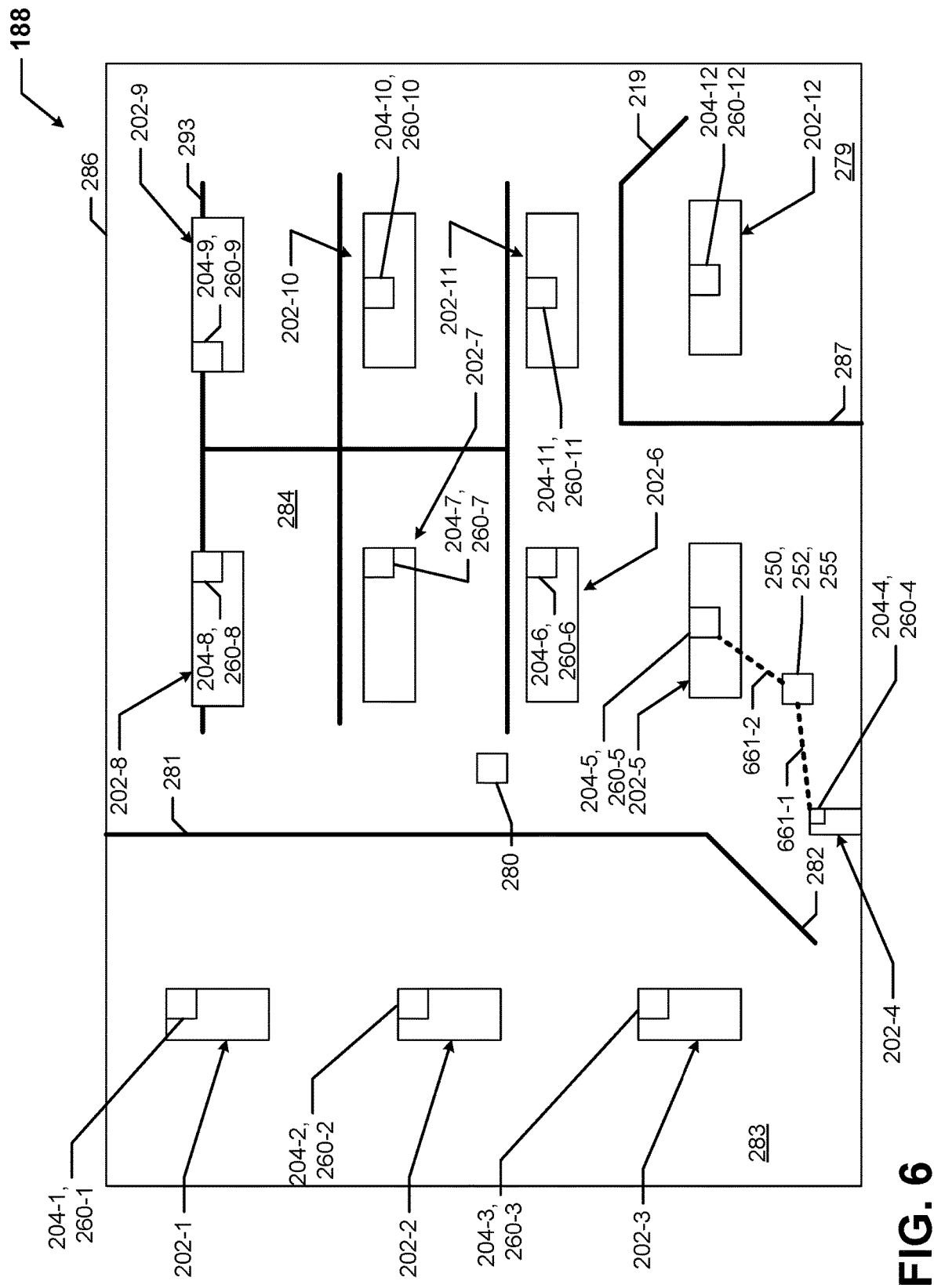

At a later point in time, as shown in FIG. 6, the user 250 has traversed the hallway 283, walked through the door 282, and is standing just inside the work space 284. At this location in the work area 188, the user 250 again operates the trigger device 252 while directing the trigger device 252 at sensor device 260-4 of electrical device 202-4 and at sensor device 260-5 of electrical device 202-5. When this is done, sensor device 260-4 and sensor device 260-5 recognize a condition that triggers an action by sensor device 260-4 and sensor device 260-5. Such an action can be, for example, sensor device 260-4 and sensor device 260-5 self-identifying.

In this example, the trigger device 252 sends a communication signal 561 directly to each sensor device 260 individually. Specifically, the trigger device 252 sends communication signal 661-1 directly to sensor device 260-4, which causes sensor device 260-4 to self-identify. Separately, the trigger device 252 sends communication signal 661-2 directly to sensor device 260-5, which causes sensor device 260-5 to self-identify.

When sensor device 260-4 and sensor device 260-5 act (e.g., self-identify) based on the condition initiated by the trigger device 252 in the entry to the work space 284, the user 250 can assign electrical device 202-4 (corresponding to sensor device 260-4) and electrical device 202-5 (corresponding to sensor device 260-5) to a group using an app on the user device 255. This grouping can be used for auto-commissioning electrical device 202-4 and electrical device 202-5, setting operational parameters of those electrical devices, and/or for performing any other alterations to those electrical devices.

Figure 7:
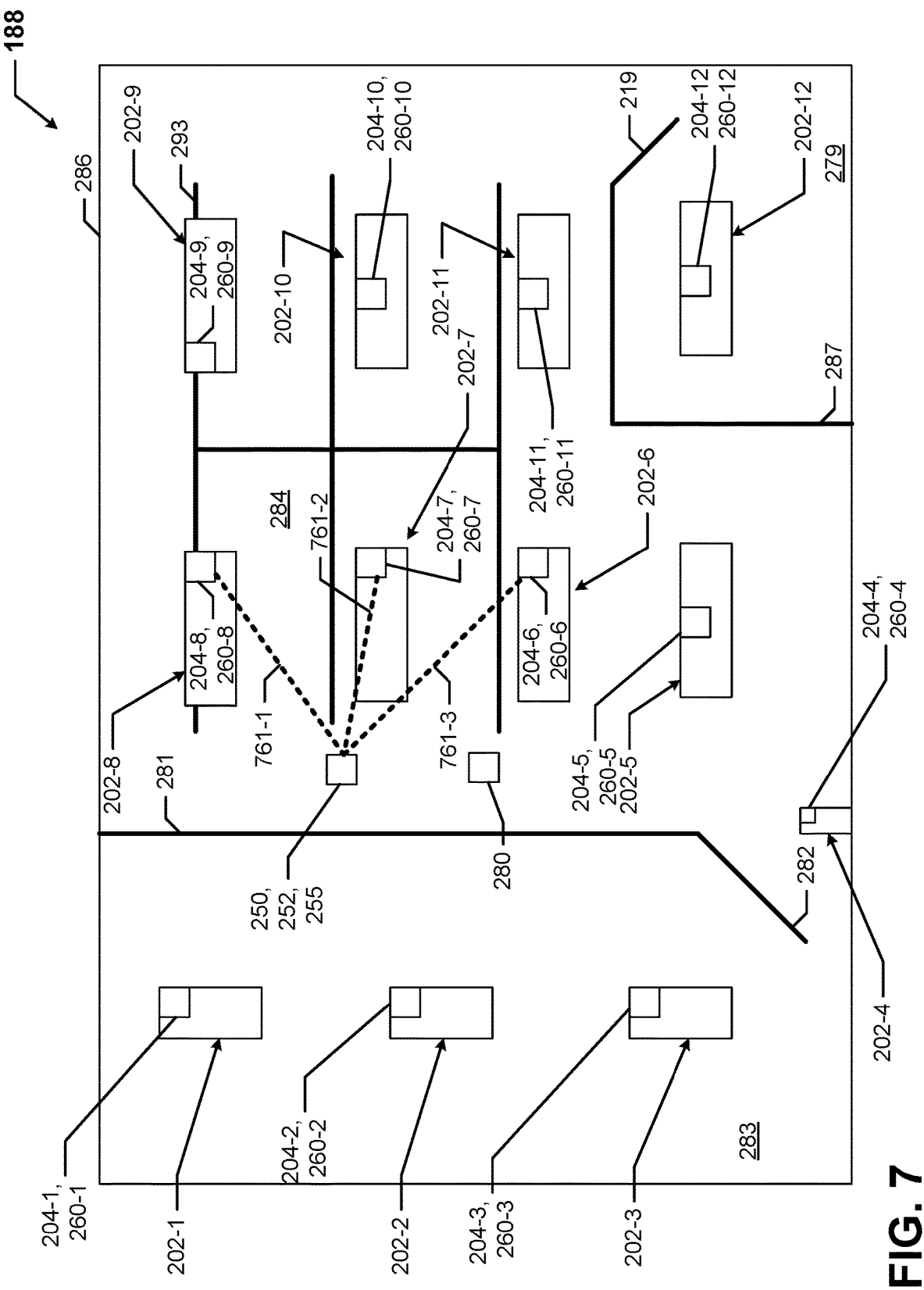

At yet a later point in time, as shown in FIG. 7, the user 250 has traveled further inside the work space 284 along wall 281. At this location in the work area 188, the user 250 again operates the trigger device 252 while directing the trigger device 252 at sensor device 260-6 of electrical device 202-6, at sensor device 260-7 of electrical device 202-7, and at sensor device 260-8 of electrical device 202-8. When this is done, sensor device 260-6, sensor device 260-7, and sensor device 260-8 recognize a condition that triggers an action by sensor device 260-6, sensor device 260-7, and sensor device 260-8. Such an action can be, for example, sensor device 260-6, sensor device 260-7, and sensor device 260-8 self-identifying.

In this example, the trigger device 252 sends a communication signal 561 directly to each sensor device 260 individually. Specifically, the trigger device 252 sends communication signal 761-3 directly to sensor device 260-6, which causes sensor device 260-6 to self-identify. Separately, the trigger device 252 sends communication signal 761-2 directly to sensor device 260-7, which causes sensor device 260-7 to self-identify. Also, separately, the trigger device 252 sends communication signal 761-1 directly to sensor device 260-8, which causes sensor device 260-8 to self-identify.

When sensor device 260-6, sensor device 260-7, and sensor device 260-8 act (e.g., self-identify) based on the condition initiated by the trigger device 252 in the work space 284, the user 250 can assign electrical device 202-6 (corresponding to sensor device 260-6), electrical device 202-7 (corresponding to sensor device 260-7), and electrical device 202-8 (corresponding to sensor device 260-8) to a group using an app on the user device 255. This grouping can be used for auto-commissioning electrical device 202-6, electrical device 202-7, and electrical device 202-8, setting operational parameters of those electrical devices, and/or for performing any other alterations to those electrical devices.

Figure 8:
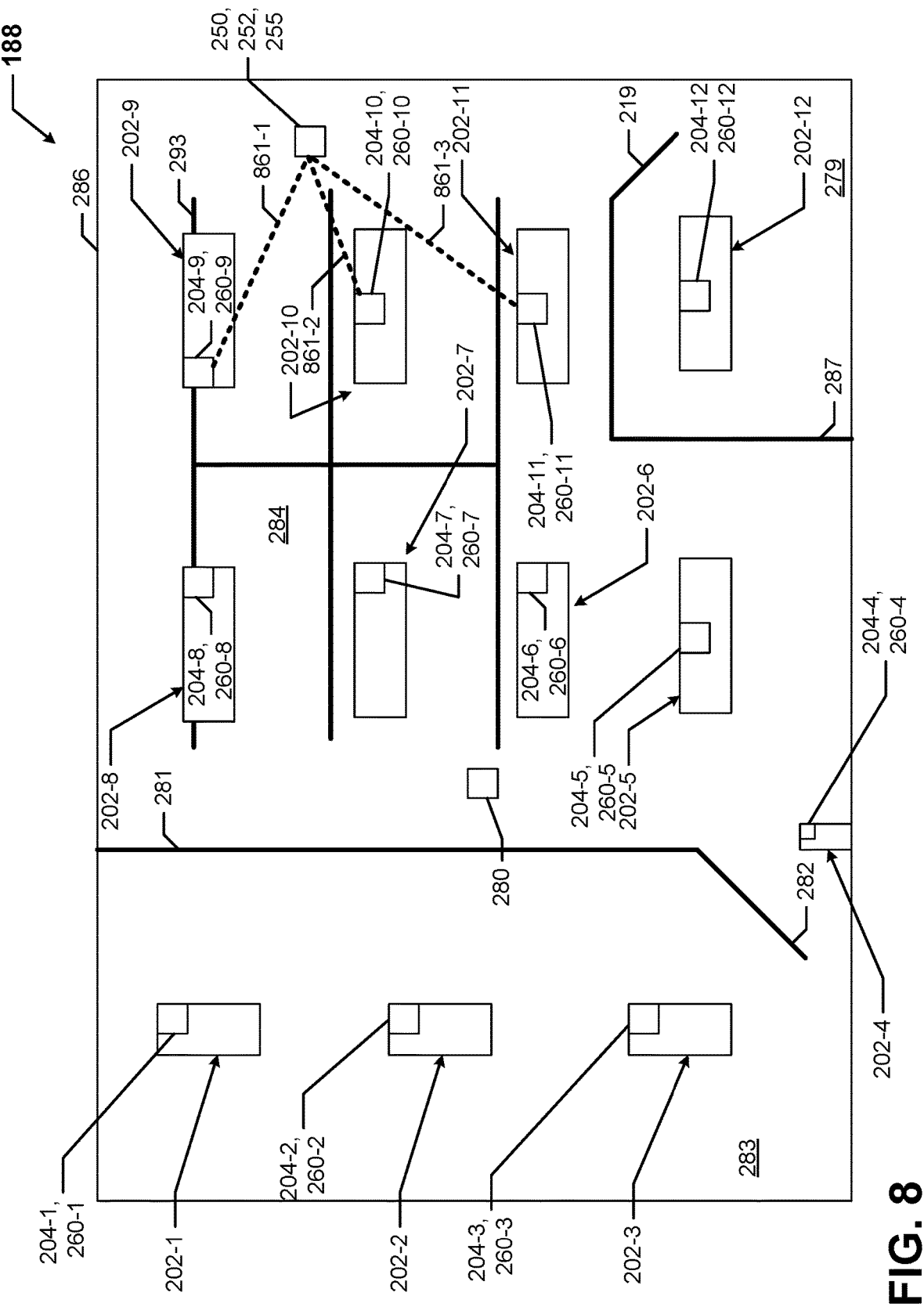

At still a later point in time, as shown in FIG. 8, the user 250 has traveled further inside the work space 284 opposite wall 281. At this location in the work area 188, the user 250 again operates the trigger device 252 while directing the trigger device 252 at sensor device 260-9 of electrical device 202-9, at sensor device 260-10 of electrical device 202-10, and at sensor device 260-11 of electrical device 202-11. When this is done, sensor device 260-9, sensor device 260-10, and sensor device 260-11 recognize a condition that triggers an action by sensor device 260-9, sensor device 260-10, and sensor device 260-11. Such an action can be, for example, sensor device 260-9, sensor device 260-10, and sensor device 260-11 self-identifying.

In this example, the trigger device 252 sends a communication signal 561 directly to each sensor device 260 individually. Specifically, the trigger device 252 sends communication signal 861-1 directly to sensor device 260-9, which causes sensor device 260-9 to self-identify. Separately, the trigger device 252 sends communication signal 861-2 directly to sensor device 260-10, which causes sensor device 260-10 to self-identify. Also, separately, the trigger device 252 sends communication signal 861-3 directly to sensor device 260-11, which causes sensor device 260-11 to self-identify.

When sensor device 260-9, sensor device 260-10, and sensor device 260-11 act (e.g., self-identify) based on the condition initiated by the trigger device 252 in the work space 284, the user 250 can assign electrical device 202-9 (corresponding to sensor device 260-9), electrical device 202-10 (corresponding to sensor device 260-10), and electrical device 202-11 (corresponding to sensor device 260-11)

to a group using an app on the user device 255. This grouping can be used for auto-commissioning electrical device 202-9, electrical device 202-10, and electrical device 202-11, setting operational parameters of those electrical devices, and/or for performing any other alterations to those electrical devices. In some cases, the user 250 can use the user device 255 to assign electrical device 202-6, electrical device 202-7, electrical device 202-8, electrical device 202-9, electrical device 202-10, and electrical device 202-11 to the same group.

Figure 9:
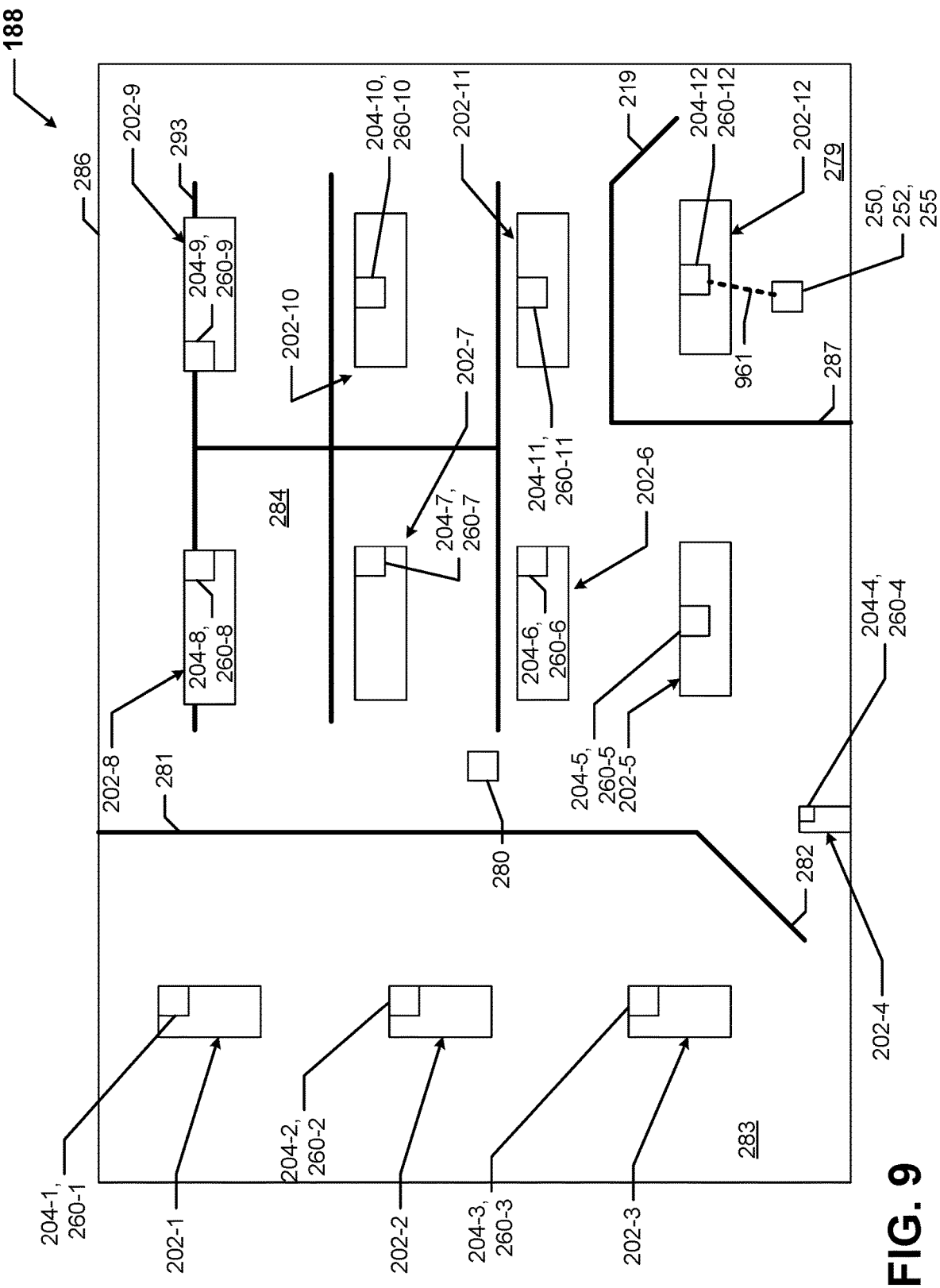

Finally, at yet a later point in time, as shown in FIG. 9, the user 250 is positioned inside of the office 279 within the work space 284. At this location in the work area 188, the user 250 again operates the trigger device 252 while directing the trigger device 252 at sensor device 260-12 of electrical device 202-12. When this is done, sensor device 260-12 recognizes a condition that triggers an action by sensor device 260-12. Such an action can be, for example, sensor device 260-12 self-identifying. In this example, the trigger device 252 sends communication signal 961 directly to sensor device 260-12, which causes sensor device 260-12 to self-identify.

When sensor device 260-12 acts (e.g., self-identifies) based on the condition initiated by the trigger device 252 in the office 279 of the work space 284, the user 250 can assign electrical device 202-12 (corresponding to sensor device 260-12) to a group using an app on the user device 255. The electrical device 202-12 can be assigned to its own group or with another group (e.g., the same group as electrical device 202-4 and electrical device 202-5). This grouping can be used for auto-commissioning electrical device 202-12, setting operational parameters of electrical device 202-12, and/or for performing any other alterations to electrical device 202-12.

The example shown in FIGS. 5-9 can be for a completely new work area 188, for one or more new electrical devices 202 within an existing work area 188, for reassigning and/or reconfiguring existing electrical devices 202 within the work area 188, and/or for any other purpose that is beneficial to a user 250 using example embodiments.

Example embodiments can intelligently and automatically organize certain electrical devices in a system by selecting those devices, directly or indirectly, in some unique and non-traditional way. For example, by forcing a sensor on an electrical device to reverse identify or otherwise identify itself, that electrical device can be assigned to a certain group or zone that is being populated. Example embodiments can be an effective way of efficiently commissioning a system of electrical devices. Example embodiments can also be used to easily create groups of electrical devices for efficient operation of those electrical devices. Example embodiments can save on maintenance and energy costs while also improving safety. Example embodiments use one or more protocols to assign electrical devices to groups and/or to address an entire group of electrical devices. The sensors used to provide data to the controller, enabling the controller work with the gateway in committing the associated electrical device to an active group or zone. Example embodiments also allow for groups to be redefined (e.g., add electrical devices, remove electrical devices, combine existing groups) at any time.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for commissioning an electrical device to a group of electrical devices comprising:
    a first electrical device comprising a first sensor device, wherein the first sensor device is configured to measure a first parameter used in operating the first electrical device;
    a trigger device, remotely located from the first electrical device and controlled by a user, wherein the trigger device emits a light signal detectable by the sensor device while pointed at the sensor device for a minimum amount of time, wherein the signal detected by the sensor device causes the first electrical device to send a first identification directly to a gateway remotely located from the trigger device;
    wherein the gateway is communicably coupled to the first electrical device, wherein the gateway receives the first identification from the first electrical device, and wherein the gateway assigns the first electrical device to a first group based on the first identification, wherein the first group comprises a plurality of electrical devices; and
    a user device, communicably coupled to and remotely located from the gateway, capable of displaying the first group to a user via a user interface, wherein a user modifies one or more parameters or devices associated with the first group via the user interface, wherein once the user modifies one or more parameters or devices associated with the first group, the first electrical device is sent, via the gateway, one or more operating parameters associated with the first group.

2. The system of claim 1, wherein the gateway assigns the first electrical device to a second group based on a selection by the user on the user device.

3. The system of claim 1, further comprising:
    a second electrical device comprising a second sensor device, wherein the second sensor device is configured to measure a second parameter used in operating the second electrical device, and wherein the trigger device emits a light signal detectable by the second sensor device that causes the second electrical device to send a second identification to the gateway,
    wherein the gateway receives the second identification from the second electrical device, wherein the gateway assigns the second electrical device to the first group based on the second identification of the second sensor device.

4. The System of claim 1, wherein once the user modifies one or more parameters or devices associated with the first group, the gateway sends the operating parameters of the first group to at least one second electrical device previously grouped with the first electrical device.

5. The system of claim 1, wherein light signal detectable by the sensor device is not detectable by the gateway.

6. The system of claim 1, wherein the trigger device is integrated with the user device.

7. The system of claim 1, wherein the trigger device comprises a laser.

8. The system of claim 7, wherein the user continuously points the laser at the first sensor device for the minimum amount of time.

9. The system of claim 1, wherein the first electrical device is added to the first group during commissioning of the first electrical device, wherein the first electrical device and other electrical devices assigned to the first group share a set of commissioning parameters.

10. The system of claim 1, wherein the first electrical device comprises a light fixture.

11. The system of claim 1, further comprising:
at least one second electrical device communicably coupled to the gateway, wherein the gateway assigns the at least one second electrical device to the first group based on the first identification of the first electrical device.

12. The system of claim 1, wherein the first electrical device is among a plurality of first electrical devices comprising a plurality of sensor devices, each sensor device associated with one of the plurality of first electrical devices, within a communication range of the trigger device, wherein the plurality of sensor devices detects the light signal, and wherein upon the plurality of sensor devices detecting the light signal, the plurality of first electrical devices send a plurality of first identifications of the plurality of first electrical devices to the gateway.

13. The system of claim 12, wherein the gateway assigns the plurality of first electrical devices to the first group based on the plurality of first identifications of the plurality of first electrical devices.

14. The system of claim 1, wherein the one or more operating parameters are assigned to the first group by the gateway.

15. The system of claim 1, wherein the first group is defined by a room.

16. The system of claim 1, wherein the first sensor device of the first electrical device, at a subsequent time, detects light signal created by the trigger device, wherein the first electrical device, upon the first sensor device detecting light signal, sends the first identification of the first electrical device, wherein the gateway receives the first identification and assigns the first electrical device to a second group.

* * * * *